United States Patent [19]

Miller

[11] Patent Number: 4,790,713
[45] Date of Patent: Dec. 13, 1988

[54] ARTICULATED MOTORCYCLE CARRIER

[76] Inventor: Robert W. Miller, 15946 Marriner Dr., Huntington Beach, Calif. 92649

[21] Appl. No.: 72,630

[22] Filed: Jul. 13, 1987

[51] Int. Cl.$^4$ .............................................. B60R 11/00
[52] U.S. Cl. .............................. 414/462; 224/42.03 B; 414/546; 414/559
[58] Field of Search .............. 224/310, 42.03 B, 42.07; 414/462, 480, 522, 537, 546, 559, 728, 742, 743, 782

[56] References Cited

U.S. PATENT DOCUMENTS 2,931,528  4/1960  Mabry ................................. 414/462
4,635,835  1/1987  Cole ................................. 414/462 X Primary Examiner—Robert J. Spar
Assistant Examiner—Janice Krizek
Attorney, Agent, or Firm—I. Michael Bak-Boychuk

[57] ABSTRACT

A motorcycle carrier is conformed to extend on an incline from the back of a vehicle in its first position and to articulate to a vertical alignment at the back of the vehicle in its second position. This articulation is achieved by translating one end of a motorcycle supporting track within a vertically aligned channel, the track being linked to the other end of the channel by a pivotal link having a length selected to define the foregoing articulation. The ends of the track may include pivotal segments between which the wheels of the motorcycle may be clamped.

5 Claims, 2 Drawing Sheets

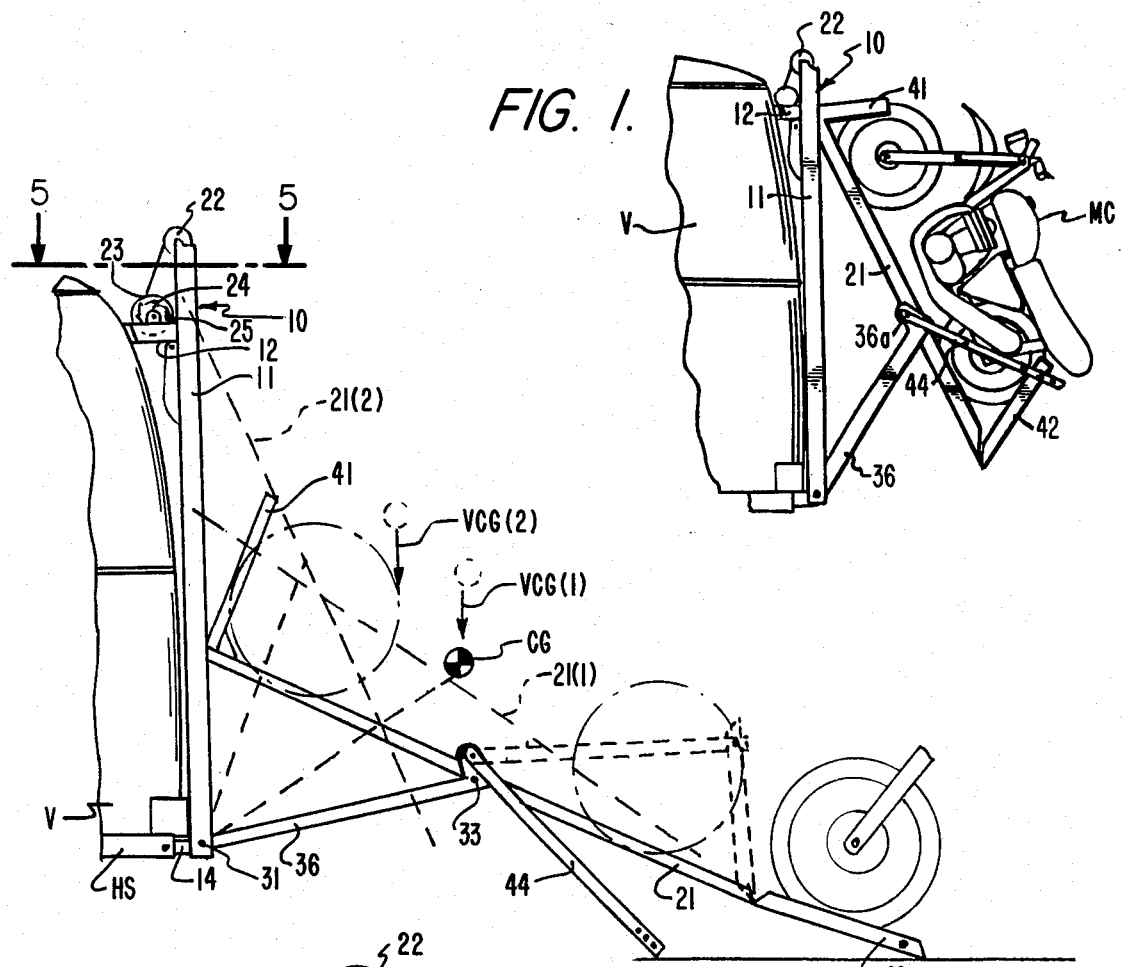
FIG. 1.
FIG. 4.
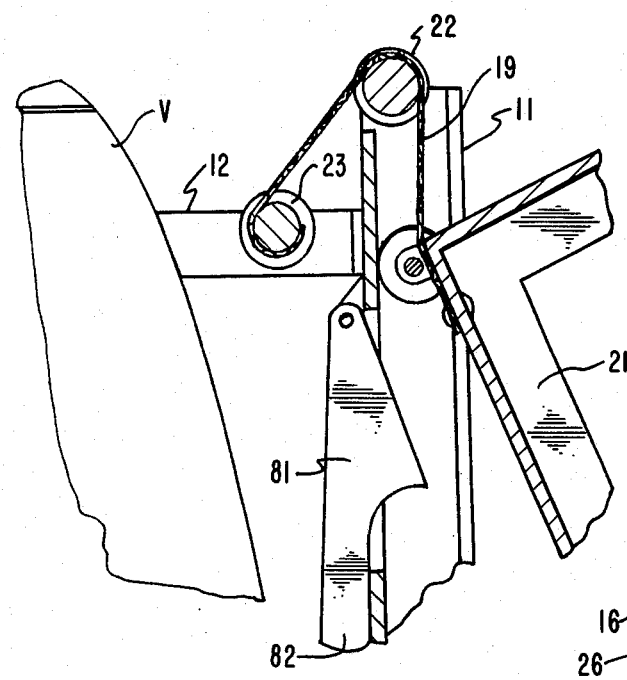
FIG. 7.
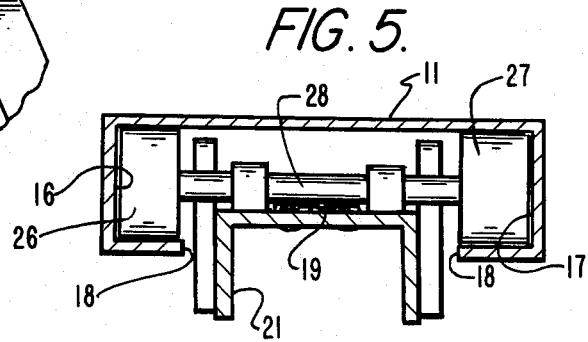
FIG. 5.

ARTICULATED MOTORCYCLE CARRIER

BACKGROUND OF THE INVENTION

1. Field of the Invention

The present invention relates to motorcycle carriers and more particularly to carriers for storing motorcycles at the rear of a motor vehicle.

2. Description of the Prior Art

Attachments for carrying motorcycles at the rear of a vehicle have been known in the past. In typical practice such carriers store the motorcycle across the rear of the vehicle and thus are limited by width to one motorcycle. Motorcycles, however, are characterized by light weight, narrow cross-section and a low center of mass relative to their wheel base and a transverse alignment is thus not favorable for optimal storage. Simply, this manner of storage aligns the largest profile of the motorcycle over the vehicle storage surface, thus limiting the number of motorcycles stored.

In today's marketplace large recreational vehicles and vans are frequently used to carry motorcycles for use at the destination. Vehicles of this kind are characterized by a large rear surface, a surface which can conveniently accommodate more than one motorcycle in vertical alignment. Moreover, these vehicles are characteristically conformed for heavy load capability and thus tolerate well this added weight.

Accordingly, techniques for storing motorcycles in vertical alignment have been sought in the past and it is one such technique that is disclosed herein.

SUMMARY OF THE INVENTION

Accordingly, it is the general purpose and object of the present invention to provide an articulated motorcycle carrier which conveniently aligns in vertical alignment.

Other objects of the invention are to provide a motorcycle carrier which articulates from deployment as a ramp to a vertical deployment.

Yet further objects of the invention are to provide a motorcycle carrier which is convenient in use and in fabrication.

Briefly, these and other objects are accomplished within the present invention by providing a vertical channel member attachable to the rear of the vehicle in which two rollers extending from the end of a track are received. The lower end of the channel member is connected by a pivotal link to a point substantially central on the track and translation of the rollers downwardly along the channel member thus concurrently results in an inclined orientation of the track. The track can thus be brought down to an inclined alignment towards the ground.

Additionally, the free end of the track may be provided with a hinged extension which can then be pivoted to form a ramp onto which the motorcycle is rolled for mounting on the track. Once in position, the motorcycle can then be clamped between this extension and a forward brace and the forward end of the track can then be lifted along the channel by taking up a flexible connection and thus lifting the motorcycle into a vertical alignment on the back of the vehicle.

In this manner several motorcycles can be stored on the rear of the vehicle each in a structure which conveniently allows for the lifting and descent.

In the foregoing arrangement the length of the channel member, the track and the pivotal linkage are selected to place the motorcycle center of mass upwardly from the link pivot. Thus, in the course of lifting a point is reached at which the force of gravity crosses the pivot. The weight of the motorcycle is then useful in assisting the lifting process and as the motorcycle height increases less force is needed for lifting. Thus, a crank may be used to lift the motorcycle without extensive force multiplying mechanisms.

BRIEF DESCRIPTION OF THE DRAWINGS

FIG. 1 is a side view of the inventive carrier in the course of articulation thereof;

FIG. 4 is a further side view of the inventive carrier illustrating the moment shift in the course of articulation thereof;

FIG. 5 is a sectional top view taken along line 5—5 of FIG. 4;

FIG. 7 is a sectional side view detail of the rolling engagement useful with the invention herein.

DESCRIPTION OF THE PREFERRED EMBODIMENT

Figure 2:
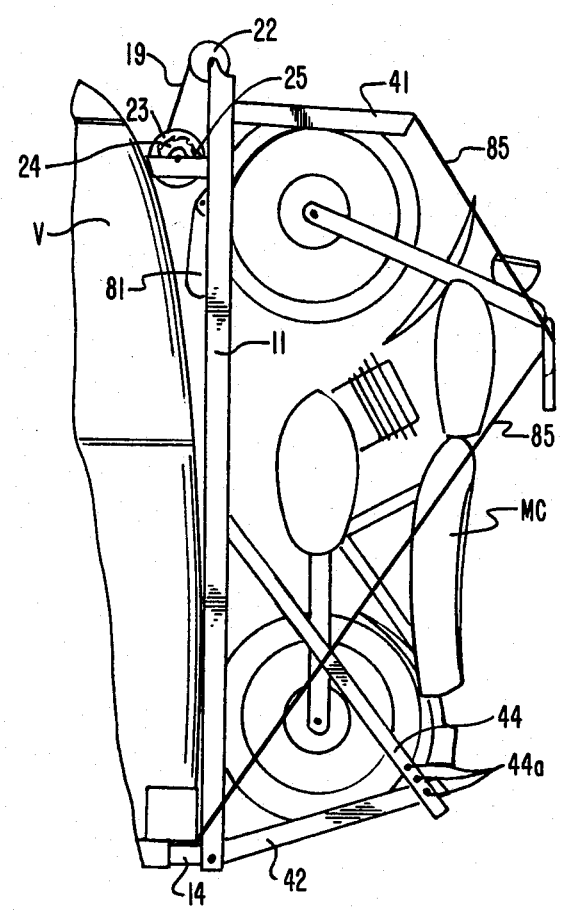
FIG. 2 is yet another side view of the inventive carrier in its erected state.
Figure 6:
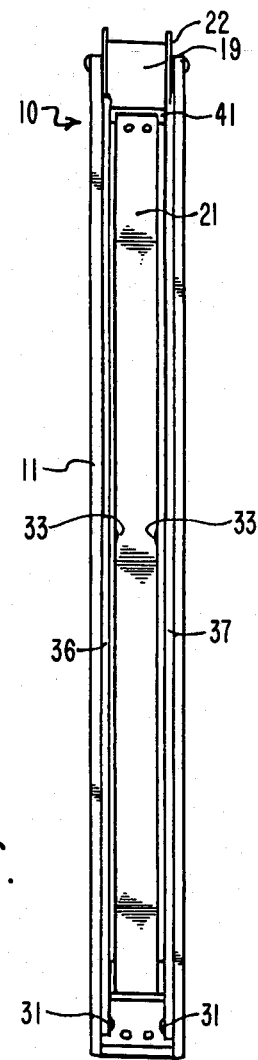
FIG. 6 is a front view of the inventive carrier in its fully raised state.
Figure 3:
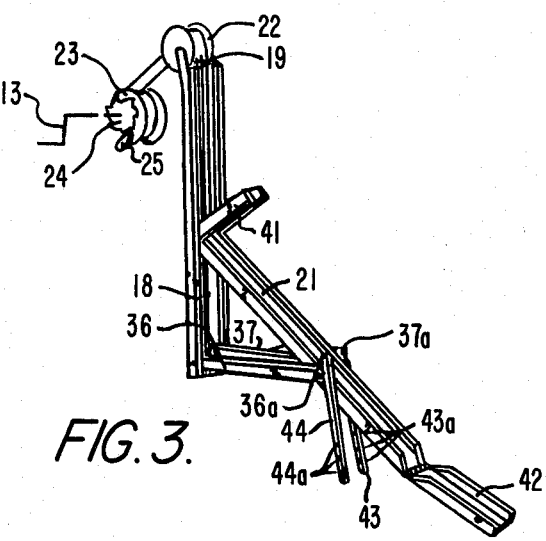
FIG. 3 is a perspective illustration of the inventive carrier deployed for mounting.

As shown in FIGS. 1 through 7, the inventive carrier generally designated by the numeral 10 comprises an elongate channel member 11 conformed for attachment to the upper rear surface of a vehicle V by way of a bracket 12 at the top thereof. At the bottom end channel member 11 attaches to a rectangular insert 14 which is conformed for receipt in the trailer hitch stock HS commonly found on a vehicle.

In this manner the vertical loads imposed on the channel member are transferred to the frame of the vehicle while the transverse loads are carried to the vehicle surface by the bracket 12. The channel member is thus restrained against all modes of loading that may be imposed thereon.

For the purposes herein channel member 11 is formed as a C-section and thus includes two oppositely aligned, longitudinal recesses or grooves 16 and 17 defining an outer opening or slot 18 in the exterior surface thereof. These grooves 16 and 17 then receive two axially aligned rollers 26 and 27 mounted on a common shaft 28 attached to the upper end of a U-sectioned track 21. This end of the track 21, moreover, is fixed to one end of a flexible strap 19 extending over a turning roller 22 fixed to the upper end of the channel member 11. From the turning roller 22 the strap then passes to a take up reel 23 fixed for rotation in bracket 12 and provided with a ratchet wheel 24 engaging a pawl 25. A crank handle 13 is then useful in advancing the reel 23.

Thus, the rotary advancement of reel 23 will take up the strap thereon, raising and lowering the end of the track along the length of the channel member. The track itself is dimensioned to fit within the gap of the slot 18 including spacing accommodations for a pair of pivotal links 36 and 37 extending from a pivot 31 at the lower end of member 11 to a pivot connection 33 proximate to the middle of the track. Links 36 and 37 are dimensioned to lie along the track within the confines of slot 18 when the rollers 26 and 27 are advanced upwardly to the full extent of the allowable travel and to scissor outwardly with a concurrent outward deployment of the bottom end of the track as the rollers progress downward within the opposed grooves 16 and 17.

Thus a downward advancement of the rollers concurrently deploys the track 21 to an inclined alignment with the bottom end thereof being advanced towards the ground. The track is therefore deployable to an alignment allowing the mounting thereon of a wheeled article like a motorcycle MC.

To secure the motorcycle MC in the course of transport the upper or forward end of the track 21 is attached to a cantilevered track segment 41 and the lower end of the track is pivotally engaged to a pivotal extension 42. When deployed for mounting the pivotal extension can be aligned to form a ramp and once the motorcycle MC is rolled into position with one wheel thereof placed in the knee between track 21 and segment 41 the extension 42 may be pivoted to engage the other wheel. In this alignment two releasable straps 43 and 44 may be stretched from the free end of the pivoted extension 42 to engage bellcranks 36a and 37a extending from the ends of links 36 and 37. Thus, the scissoring motion of the links in the course of the upward advancement of the rollers will concurrently tension the straps, securing the motorcycle MC for transport.

Of course straps 43 and 44 may include several points of attachment 43a and 44a to accommodate various motorcycle configurations and the reel 23 may be driven by an electric motor selectively connected by a switch to the battery of the vehicle V.(Not shown.)

Those skilled in the art will appreciate that a typical motorcycle MC is characterized by a center of gravity substantially in the middle of its wheel base displaced above the tire foot print plane. This center of gravity, CG, when the motorcycle MC is mounted on the track is slightly ahead (upwardly) of the link print.

Accordingly, as illustrated in FIG. 4, the initial weight bias on the track 21 is ahead of the pivot connection 33 loading the strap in tension when advanced to the alignment 21(1). At this point the weight bias vector VCG(1) is exactly through the pivot connection and there is, therefore, no moment to oppose at the strap. As the roller end of track 21 is then lifted beyond this point, to the alignment 21(2), then the weight bias VCG(2) is outside the link pivot connection 33 thus advancing the motorcycle upwardly by its own weight to its carried state. The weight of the motorcycle is thus useful to effect lifting which is opposed only by the bellcrank geometry of bellcranks 36a and 36b.

Once the motorcycle MC is thus lifted to the position illustrated in FIG. 1 the further geometric gain may be insufficient to oppose the weight moment obtained from the bellcranks. Accordingly, member 11 is provided with a weighted pawl 81 extending into grooves 16 & 17 to oppose the upward travel of rollers 26 & 27. This pawl assembly is located proximate the upper end of channel member 11 at a point where the vector VCG just crosses to the outside the pivotal connection 33. Thus the further upward travel of the rollers is latched in until the user manually releases the pawl 81 by pushing aside a bob weight 82 extending therefrom.

Since the foregoing pawl engagement is close to the neutral weight moment position only small manual forces are required to effect release and further positioning of the track 21 within member 11 is partly opposed by the geometric compression effected by bellcranks 36(a) and 37(a). As a consequence a self effecting mechanism is devised which conveniently raises and stores various motorcycles at the rear of the vehicle V. Of course various securing straps 85 may then be used for retaining the stored motorcycle in place.

Accordingly, a carrier is thus formed which both allows for convenient loading and for tensioning the motorcycle thereon once articulated to its transport alignment.

Obviously, many modifications and changes may be made to the foregoing without departing from the spirit of the invention. It is therefore intended that the scope of the invention be determined solely on the claims appended hereto.

What is claimed is:

1. An articulated lifting assembly useful in lifting and securing a motorcycle onto the rear structure of a motor vehicle, comprising:
   a vertical frame including a vertical channel member conformed for vertical attachment to said rear structure of said vehicle, said vertical channel member including an upper and a lower end;
   an elongate track conformed to receive said motorcycle and including a first end and a second end conformed for longitudinal receipt in said channel member, including rolling means at said first end thereof adopted for rolling in said channel member, said first end of said track being aligned for translation towards said upper end of said channel member;
   pivotal link means pivotally connected between said track, intermediate said first and second ends thereof, and said lower end of said channel member for articulating said second end of said track away from said channel member in the course of translation of said first end away from said upper end of said channel member;
   a pivotal segment engaged for pivotal articulation from said second end of said track;
   connecting means selectively engageable between said segment and said link means for pivotally advancing said segment towards said track in the course of advancement of said first end towards said upper end;
   a flexible strap connected to said first end; and
   a take up reel operatively connected to said vertical frame and affixed to receive said strap thereon.

2. Apparatus according to claim 1 further comprising:
   a cantilevered brace extending substantially orthogonally from said track proximate said first end thereof.

3. An articulated lifting structure attachable to the rear of a motor vehicle and conformed to support a motorcycle thereon, comprising:
   an elongate vertical channel member, of a first length selectively secured to the rear of said vehicle in vertical alignment therewith, said channel member including an upper and a lower end;
   an elongate track, of a second length, defined by a first end engaged for rolling translation along said channel member and a second end, and conformed for longitudinal receipt within said channel member, said second length being substantially equal to said first length;
   elongate link means pivotally engaged to said lower end and to said track intermediate said first and second ends, said elongate link means being of a third length substantially one half of said second length;

locating means fixed to said track for aligning said motorcycle thereon whereby the center of mass of said motorcycle is aligned proximate the pivotal connection of said link means to said track; and lifting means for advancing said first end along said channel member, whereby the weight of said motorcycle assists in the advancement of said first end towards said upper end.

4. Apparatus according to claim 3, further comprising:
  selectively releasable detent means mounted in said channel member for selectively opposing the advancement of said first end towards said upper end.

5. Apparatus according to claim 4, wherein:
  said first end includes rolling means for rolling engagement with said channel member.

* * * * *